(12) United States Patent
Kim et al.

(10) Patent No.: US 8,913,577 B2
(45) Date of Patent: *Dec. 16, 2014

(54) METHOD AND APPARATUS FOR A STATION TO OPERATE WITHIN WLAN SYSTEM

(71) Applicant: LG Electronics Inc., Seoul (KR)

(72) Inventors: Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,449

(22) Filed: Feb. 26, 2013

(65) Prior Publication Data

US 2013/0170458 A1 Jul. 4, 2013

Related U.S. Application Data

(63) Continuation of application No. 13/096,289, filed on Apr. 28, 2011, now Pat. No. 8,416,743.

(60) Provisional application No. 61/394,351, filed on Oct. 19, 2010, provisional application No. 61/375,291, filed on Aug. 20, 2010, provisional application No. 61/351,945, filed on Jun. 7, 2010.

(51) Int. Cl.
| | |
|---|---|
| *H04W 4/00* | (2009.01) |
| *H04W 72/04* | (2009.01) |
| *H04W 48/14* | (2009.01) |
| *H04W 72/00* | (2009.01) |
| *H04B 7/00* | (2006.01) |
| *H04W 16/14* | (2009.01) |
| *H04W 72/02* | (2009.01) |

(52) U.S. Cl.
CPC .......... *H04W 72/0453* (2013.01); *H04W 48/14* (2013.01); *H04W 16/14* (2013.01); *H04W 72/02* (2013.01)
USPC ............................ 370/329; 455/450; 455/509

(58) Field of Classification Search
CPC combination set(s) only.
See application file for complete search history.

(56) References Cited

U.S. PATENT DOCUMENTS

| | | | |
|---|---|---|---|
| 5,276,908 A | 1/1994 | Koohgoli et al. | |
| 5,774,805 A | 6/1998 | Zicker | |

(Continued)

FOREIGN PATENT DOCUMENTS

| | | |
|---|---|---|
| CN | 1221542 A | 6/1999 |
| CN | 1745528 A | 3/2006 |

(Continued)

OTHER PUBLICATIONS

USPTO Office Action dated Aug. 7, 2013 in related technology U.S. Appl. No. 13/384,844.

(Continued)

*Primary Examiner* — Clemence Han
(74) *Attorney, Agent, or Firm* — Morgan, Lewis & Bockius LLP

(57) ABSTRACT

Methods and apparatuses for a specific station, operating as a non-AP (Access Point) station permitted to operate within available channels not used by a licensed device, to operate as an AP station in a Wireless Local Area Network (WLAN) are disclosed. A specific protocol related to a registration of a station's location to operate within a white space id defined whose Information IDs comprises a registration request and a registration response. Using the defined registration request and registration response, the station can register its geographical location with a Registered Location Server (RLS), and operate as an AP STA within WS.

10 Claims, 11 Drawing Sheets

(56) References Cited

U.S. PATENT DOCUMENTS

| | | |
|---|---|---|
| 6,175,739 B1 | 1/2001 | Ishii et al. |
| 6,757,550 B1 | 6/2004 | Yoneyama et al. |
| 6,826,400 B1 | 11/2004 | Cashman et al. |
| 6,882,841 B1 | 4/2005 | Youn |
| 7,280,834 B2 | 10/2007 | Takarabe |
| 7,742,764 B2 | 6/2010 | Gillig et al. |
| 7,917,110 B2 | 3/2011 | Horiguchi et al. |
| 8,032,086 B2 | 10/2011 | Waltho et al. |
| 8,483,155 B1 | 7/2013 | Banerjea et al. |
| 8,583,129 B2 | 11/2013 | Kim et al. |
| 8,588,158 B2 | 11/2013 | Kim et al. |
| 8,588,160 B2 | 11/2013 | Kim et al. |
| 8,605,741 B2 | 12/2013 | Kim et al. |
| 2002/0154653 A1 | 10/2002 | Benveniste |
| 2003/0050012 A1 | 3/2003 | Black et al. |
| 2003/0093526 A1 | 5/2003 | Nandagopalan et al. |
| 2004/0151137 A1 | 8/2004 | McFarland et al. |
| 2005/0003827 A1 | 1/2005 | Whelan |
| 2005/0063334 A1 | 3/2005 | Fnu et al. |
| 2005/0070279 A1 | 3/2005 | Ginzburg et al. |
| 2005/0169292 A1 | 8/2005 | Young |
| 2006/0034236 A1 | 2/2006 | Jeong et al. |
| 2006/0062183 A1 | 3/2006 | Forte et al. |
| 2006/0067354 A1 | 3/2006 | Waltho et al. |
| 2006/0089964 A1 | 4/2006 | Pandey et al. |
| 2006/0218392 A1 | 9/2006 | Jonston |
| 2007/0014267 A1 | 1/2007 | Lam et al. |
| 2007/0047492 A1 | 3/2007 | Kim et al. |
| 2007/0192472 A1 | 8/2007 | Tokunaga et al. |
| 2007/0253394 A1 | 11/2007 | Horiguchi et al. |
| 2008/0130519 A1 | 6/2008 | Bahl et al. |
| 2008/0151796 A1 | 6/2008 | Jokela |
| 2008/0165754 A1 | 7/2008 | Hu |
| 2008/0171552 A1 | 7/2008 | Hyon et al. |
| 2008/0240024 A1 | 10/2008 | Rao et al. |
| 2008/0268832 A1 | 10/2008 | Peng |
| 2008/0298333 A1 | 12/2008 | Seok |
| 2009/0061783 A1 | 3/2009 | Choi et al. |
| 2009/0111463 A1 | 4/2009 | Simms et al. |
| 2009/0158282 A1 | 6/2009 | Blaisdell et al. |
| 2009/0171930 A1 | 7/2009 | Vaughan et al. |
| 2009/0191906 A1 | 7/2009 | Abedi |
| 2009/0196180 A1 | 8/2009 | Bahl et al. |
| 2009/0197627 A1 | 8/2009 | Kuffner et al. |
| 2009/0207800 A1 | 8/2009 | Shan et al. |
| 2009/0217333 A1 | 8/2009 | Young et al. |
| 2009/0268674 A1 | 10/2009 | Liu et al. |
| 2009/0280748 A1 | 11/2009 | Shan et al. |
| 2009/0298522 A1 | 12/2009 | Chaudhri et al. |
| 2009/0323835 A1 | 12/2009 | Rao et al. |
| 2009/0325499 A1 | 12/2009 | Corke et al. |
| 2010/0008285 A1 | 1/2010 | Kuroda |
| 2010/0030907 A1 | 2/2010 | Pollak |
| 2010/0034160 A1 | 2/2010 | Prakash et al. |
| 2010/0048234 A1 | 2/2010 | Singh |
| 2010/0061299 A1 | 3/2010 | Kennedy et al. |
| 2010/0069013 A1 | 3/2010 | Chaudhri et al. |
| 2010/0081449 A1 | 4/2010 | Chaudhri et al. |
| 2010/0091712 A1 | 4/2010 | Lu et al. |
| 2010/0111235 A1 | 5/2010 | Zheng et al. |
| 2010/0124254 A1 | 5/2010 | Wu et al. |
| 2010/0142458 A1 | 6/2010 | Mark |
| 2010/0175101 A1 | 7/2010 | Devictor et al. |
| 2010/0177756 A1 | 7/2010 | Choi et al. |
| 2010/0195580 A1 | 8/2010 | Samarasooriya et al. |
| 2010/0195590 A1 | 8/2010 | Park |
| 2010/0195667 A1 | 8/2010 | Wang et al. |
| 2010/0220687 A1 | 9/2010 | Reznik et al. |
| 2010/0229205 A1 | 9/2010 | Hakusui |
| 2010/0232372 A1 | 9/2010 | Jakllari et al. |
| 2010/0246434 A1 | 9/2010 | Wang et al. |
| 2010/0246506 A1 | 9/2010 | Krishnaswamy |
| 2010/0303026 A1 | 12/2010 | Chaudhri et al. |
| 2010/0309317 A1 | 12/2010 | Wu et al. |
| 2010/0309806 A1 | 12/2010 | Wu et al. |
| 2011/0019649 A1 | 1/2011 | Dayal et al. |
| 2011/0043710 A1 | 2/2011 | Samarasooriya et al. |
| 2011/0045781 A1 | 2/2011 | Shellhammer et al. |
| 2011/0090887 A1 | 4/2011 | Kim et al. |
| 2011/0090890 A1 | 4/2011 | Seok et al. |
| 2011/0091393 A1 | 4/2011 | Simmonds et al. |
| 2011/0116458 A1* | 5/2011 | Hsu et al. .................. 370/329 |
| 2011/0122855 A1 | 5/2011 | Henry |
| 2011/0164581 A1 | 7/2011 | Keon |
| 2011/0222488 A1* | 9/2011 | Kim et al. .................. 370/329 |
| 2011/0243078 A1* | 10/2011 | Kim et al. .................. 370/329 |
| 2011/0286405 A1* | 11/2011 | Kim et al. .................. 370/329 |
| 2012/0063364 A1 | 3/2012 | Emmelmann et al. |
| 2012/0096492 A1 | 4/2012 | Urban et al. |
| 2012/0096498 A1 | 4/2012 | Wu et al. |
| 2012/0120904 A1* | 5/2012 | Seok et al. .................. 370/329 |
| 2012/0165056 A1* | 6/2012 | Kim et al. .................. 455/509 |
| 2012/0170534 A1* | 7/2012 | Kim et al. .................. 370/329 |
| 2012/0208558 A1 | 8/2012 | Bajko et al. |
| 2012/0218956 A1* | 8/2012 | Kim et al. .................. 370/329 |
| 2012/0315855 A1 | 12/2012 | Li et al. |
| 2013/0114586 A1 | 5/2013 | Kim et al. |
| 2013/0142132 A1 | 6/2013 | Kim et al. |
| 2014/0113649 A1 | 4/2014 | Bajko et al. |

FOREIGN PATENT DOCUMENTS

| | | |
|---|---|---|
| CN | 101006683 A | 7/2007 |
| CN | 101242333 A | 8/2008 |
| JP | 2004-286460 A | 10/2004 |
| JP | 2007-043391 A | 2/2007 |
| JP | 2007-184850 A | 7/2007 |
| JP | 2007300419 A | 11/2007 |
| JP | 2008-278456 A | 11/2008 |
| JP | 2009-200582 A | 9/2009 |
| KR | 2009-0021865 | 3/2009 |
| WO | 2006/117587 | 11/2006 |
| WO | 2009/016800 A2 | 2/2009 |
| WO | 2009/031825 A2 | 3/2009 |
| WO | 2009/061779 A1 | 5/2009 |
| WO | 2009/069068 A2 | 6/2009 |
| WO | 2009/136760 A1 | 11/2009 |

OTHER PUBLICATIONS

U.S. Office Action (U.S. Appl. No. 12/908,449) dated Sep. 5, 2013.

Chinese Office Action dated Dec. 23, 2013, issued in Chinese Patent Application No. 200980161376.8.

U.S. Office Action dated Jan. 6, 2014, issued in U.S. Appl. No. 12/993,409.

Ha Nguyen Tran et al., "Requirements and Amendment Regarding TVWS Database Access," IEEE 802.11-10/0262r1, IEEE mentor, Mar. 17, 2010.

Necati Canpolat et al., "TGu Single GAS Protocol," IEEE 802.11-10/0266r49, IEEE mentor, Mar. 18, 2010.

Eunsun Kim et al., "Normative Text for Scanning in TV Whitespaces," IEEE 802.11-10/0472r2, IEEE mentor, May 11, 2010.

U.S. Office Action dated Jan. 16, 2014, issued in U.S. Appl. No. 14/074,276.

Cordeiro et al., "IEEE 802.22: An introduction to the first wireless standard based on gognitive radios", IEEE Journal of communications, vol. 1, No. 1, pp. 38-47, Apr. 2006.

Challapali et al., "Spectrum agile radio: detecting spectrum opportunities", ISART, Boulder, Colorado, Mar. 2-4, 2004.

Sturza et al. "White Spaces Engineering Study: can cognitive radio technology operating in the TV white spaces completely protect licensed TN broadcasting?" New America Foundation Wireless Future Program, working paper No. 16, Jan. 2007.

Bahl et al. "White Space Networking with Wi-Fi like Connectivity," ACM SIGCOMM 2009, Aug. 17, 2009.

Pagadarai et al. "Wireless Spectrum Characterisation and Dynamic Utilization in Vehicular Communication Networks," Final Report, Wireless Innovation Laboratory, Worcester Polytechnic Institute, Sep. 30, 2009.

Wei et al. "Two-Hop-Relay Architecture for Next-Generation WWAN/WLAN Integration," IEEE Wireless Communications, Apr. 2004, pp. 2-9.

(56) References Cited

OTHER PUBLICATIONS

Singh et al. "PAMAS-Power Aware Multi-Access Protocol with Signalling for Ad Hoc Networks," Computer Communication Review, vol. 28, Issue 3, Jul. 1998, pp. 5-26.

Juha Ala Laurila et al. "Wireless LAN Access Network Architecture for Mobile Operators," Computer Communication Review, IEEE Communications Magazine, Nov. 2001, pp. 82-89.

Han et al., "Introduction of Cognitive Radio Network, KIISE Information Review", vol. 22, No. 2, pp. 1-16, Nov. 2008.

Mangold et al., "Spectrum agile radio: radio resource measurements for opport unities spectrum usage", IEEE Global telecommunications conference Nov. 29, 2004-Dec. 1, 2004, vol. 6, pp. 3467-3471, Nov. 2004.

PCT International Search Report for Application No. PCT/KR2010/007076 dated Jun. 24, 2011.

PCT International Search Report for Application No. PCT/KR2010/06955 dated Jun. 24, 2011.

PCT International Search Report for Application No. PCT/KR2011/002276 dated Dec. 28, 2011.

PCT International Search Report for Application No. PCT/KR2010/008976 dated Aug. 22, 2011.

PCT International Search Report for Application No. PCT/KR2009/006103 dated Sep. 10, 2010.

PCT International Search Report for Application No. PCT/KR2009/06104 dated Sep. 30, 2010.

PCT International Search Report for Application No. PCT/KR2010/007011 dated Jun. 21, 2011.

PCT International Search Report for Application No. PCT/KR2010/006954 dated Jun. 24, 2011.

Office Action from corresponding U.S. Appl. No. 12/993,409 dated Jan. 4, 2012.

U.S. Office Action (U.S. Appl. No. 13/046,048) dated Dec. 7, 2012.

U.S. Office Action (U.S. Appl. No. 12/910,186) dated Dec. 6, 2012.

Office Action issued in related technology U.S. Appl. No. 12/993,409 mailed Jul. 3, 2012.

N.Srivastava, et al., "Expanding Wireless Communication White Space", White Paper of Dell Inc., Oct. 2008.

C.R. Stevenson, et al., "IEEE 802.22: The First Cognitive Radio Wireless Regional Area Network Standard", IEEE Communications Magazine, Jan. 2009, pp. 130-138.

International Search Report for PCT/KR2010/001885.

USPTO—U.S. Appl. No. 13/030,654—Office Action—Issued on Feb. 12, 2013.

Notice of Allowance issued for related technology U.S. Appl. No. 13/051,562, mailed Jul. 17, 2013.

Notice of Allowance issued for related technology U.S. Appl. No. 12/910,186, mailed Jul. 15, 2013.

Nan Hao, et al., Short-Range WLAN Compatible Hybrid Cognitive Radio Networks System and MAC Protocol, Communication Software and Networks, 2009, ICCSN 2009 International Conference on Communication Software and Networks, IEEE, Feb. 28, 2009, pp. 81-86.

Canadian Office Action dated Feb. 3, 2014, issued in Canadian Patent Application No. 2773660.

Notice of Allowance dated Apr. 25, 2014, issued in U.S. Appl. No. 12/993,409.

Office Action dated Apr. 1, 2014, issued by the State Intellectual Property Office of China in Chinese Patent Application No. 201080058187.0.

Nekovee, Maziar, "A Survey of Cognitive Radio Access to TV White Spaces," Ultra Modem Telecommunications & Workshops, ICUMT'09, International Conference on, Oct. 12, 2009, pp. 1-8.

Office Action dated Mar. 7, 2014, issued in U.S. Appl. No. 12/908,449.

Office Action dated May 23, 2014, issued in U.S. Appl. No. 14/074,276.

Office Action dated Jun. 25, 2014, issued in U.S. Appl. No. 12/908,449.

Office Action dated Jun. 27, 2014, issued by the State Intellectual Property Office of China in Chinese Patent Application No. 201080065876.4.

Office Action dated Jul. 3, 2014, issued by the State Intellectual Property Office of China in Chinese Patent Application No. 201080065374.1.

\* cited by examiner

| Category | Action Value | Requester STA Address | Responder STA Address | Reason Result Code | Enablement Identifer |
|---|---|---|---|---|---|
| Octets: 1 | 1 | 6 | 6 | 1 | 2 |

Figure 7

| Element ID | Length | Advertisement Protocol Tuple #1 | Advertisement Protocol Tuple #2 (optional) | Advertisement Protocol Tuple #n (optional) |
|---|---|---|---|---|

Octets :   1   1   Variable   Variable   Variable

| Query Response Length Limit | PAME-BI | Advertisement Protocol ID |
|---|---|---|

Octets :             1                    Variable

Figure 9

| Info ID | Length | Information |
|---|---|---|

Octets :    2         2         Variable

Figure 10

| Info ID | Length | Requester STA Address | Responder STA Address | Reason Result Code | Enablement Identifer | White Space Map element body |
|---|---|---|---|---|---|---|

Octets :    1         2          6          6          1          2         Variable

| Info ID | Length | Requester STA Address | Responder STA Address | Enablement Identifier | FCC Identifier | Serial Number | LCI |
|---|---|---|---|---|---|---|---|
| Octets: 1 | 2 | 6 | 6 | 2 | variable | variable | variable |

Figure 16

| Info ID | Length | Requester STA Address | Responder STA Address | Enablement Identifier | White Space Map |
|---|---|---|---|---|---|
| 1 | 2 | 6 | 6 | 2 | variable |

Octets:

METHOD AND APPARATUS FOR A STATION TO OPERATE WITHIN WLAN SYSTEM

CROSS REFERENCE TO RELATED APPLICATIONS

Pursuant to 35 U.S.C. §119(e), this application claims the benefit of the U.S. provisional Application Nos. 61/351,945, 61/375,291, and 61/394,351, filed on Jun. 7, 2010, Aug. 20, 2010, and Oct. 19, 2011, and U.S. application Ser. No. 13/096,289, filed Apr. 28, 2011, which are hereby incorporated by reference as if fully set forth herein.

BACKGROUND OF THE INVENTION

1. Field of the Invention

The present invention relates to a wireless local area network (WLAN), and more particularly, to methods and apparatuses for a station, permitted to operate within available channels not used by a licensed device, to select a channel to begin its transmission in a Wireless Local Area Network (WLAN).

2. Discussion of the Related Art

The standard for a Wireless Local Area Network (WLAN) technology is established by IEEE 802.11 standard association. IEEE 802.11a/b among IEEE 802.11 standards provides 11 Mbps (IEEE 802.11b) or 54 Mbps (IEEE 802.11a) transmission efficiency using unlicensed band on 2.4. GHz or 5 GHz frequency band. IEEE 802.11g, adapting OFDM (Orthogonal Frequency Divisional Multiplexing) technology, provides 54 Mbps transmission efficiency. And, IEEE 802.11n, adapting MIMO-OFDM technology, provides 300 Mbps transmission efficiency for 4 spatial streams. IEEE 802.11n provides 40 MHz channel bandwidth, and in this case it provides up to 600 Mbps transmission efficiency.

Now, a standard for regulating the WLAN operation in TV White Space is under establishment, as IEEE 802.11 af.

TV Whitespace includes channels allocated to broadcast TV, which are permitted to be used by cognitive radio device. TV White Space may include UHF band and VHF band. The spectrum not used by a licensed device (hereinafter, can be called as 'White Space') can be used by an unlicensed device. The frequency band permitted to be used by unlicensed device can be differently defined for each country. Generally, this frequency band comprises 54-698 MHz (US, Korea), and some of this frequency band can't be used for the unlicensed device. Here, 'licensed device' means a device of the user permitted in this frequency band, and can be differently called as 'primary user', or 'incumbent user'. Hereinafter, the term of 'incumbent user' can be collectively used for these terms.

Unlicensed device should provide a protection mechanism for the incumbent user. That is, the unlicensed device should stop using a specific channel, when an incumbent user, such as wireless microphone, is using that specific channel. For this purpose, spectrum sensing mechanism is required. Spectrum sensing mechanism comprises Energy Detection scheme, Feature Detection scheme, etc. By using this mechanism, unlicensed device determines that the channel is used by an incumbent user, when the strength of the primary signal is greater than a predetermined level, or when DTV (Digital Television) Preamble is detected. And, the unlicensed device (station or Access Point) shall lower its transmission power, when it is detected that the neighboring channel, next to the channel used by the unlicensed device, is used by the incumbent user.

Further, the unlicensed device should search for a network to be connected in a specific channel in WS (White Space). As stated above, the unlicensed device is permitted to operate only within available channels not used by the incumbent user.

For these purposes, the unlicensed device, which wishes to use the White Space (WS), shall acquire information for available channel list at its location. However, individual sensing mechanism takes significant time and consume huge amount of power, thus it is needed for the unlicensed device to acquire the available channel information more effectively.

The unlicensed device should be enabled by an enabling STA or enabler to operate in WS. And, for some times, a STA operating as a non-AP station has to operate as an AP STA. Therefore, appropriate mechanisms for these operations are needed.

SUMMARY OF THE INVENTION

Technical Problem

One aspect of the present invention is for providing a mechanism for a station, permitted to operate within available channels not used by a licensed device, to select a channel to begin its transmission in a Wireless Local Area Network (WLAN). For this mechanism, one embodiment of the present invention provides a specific protocol related to a registration of a station's location to operate within a white space.

One embodiment of the present invention proposes this protocol as a Registered Location Query Protocol (RLQP) whose element ID indicates a Channel Query protocol. Further, the above mechanism can be related to an enabling mechanism of letting the unlicensed device to operate efficiently in WS. Thus, the enabling mechanism using RLQP will be explained.

To operate as an AP station in a WLAN, the station has to acquire information on the available channels not used by an incumbent user. Thus, another aspect of the present invention is for providing a method for effectively acquiring available channel information from a TV band database. Some examples for this aspect are for acquiring available channel information as a White Space Map (WSM) from a station which can access a regulatory database. Some examples for this aspect are for effectively acquiring WSM using Generic Advertisement Service (GAS) protocol.

The object of the present invention is not limited the above stated objects, but includes various objects recited or apparent in/from the detailed description of the present invention.

Technical Solution

One aspect of the present invention provides a method for a station, permitted to operate within available channels not used by a licensed device, to select a channel to begin a transmission of signals in a Wireless Local Area Network (WLAN), the method comprising: transmitting a first frame comprising an information element whose element ID indicates a specific protocol related to a registered location query, wherein the information element comprises information on a geographical location of the station; receiving a second frame comprising a result of the query and information for the available channels based on the information on the geographical location of the station in a form of a White Space Map (WSM); and selecting a channel among the available channels to begin the transmission of signals in the WLAN.

Another aspect of the present invention provides a station device permitted to operate within available channels not used by a licensed device and configured to select a channel to begin a transmission of signals in a Wireless Local Area Network (WLAN), the station device comprising: a transmitter configured for transmitting a first frame comprising an information element whose element ID indicates a specific protocol related to a registered location query, wherein the information element comprises information on a geographical location of the station device; a receiver configured for receiving a second frame comprising a result of the query and information for the available channels based on the information on the geographical location of the station device in a form of a White Space Map (WSM); and a processor operably connected to the transmitter and the receiver and configured for selecting a channel among the available channels to begin the transmission of signals in the WLAN according to the received WSM. The information element may further comprise device identification information of the station transmitting the first frame. In one example, the device identification information may comprise a FCC (Federal Communications Commission) identifier of the station, and a serial number of the station.

The result of the query may be acquired from a registered location server (RLS).

The information element may be a registered location query protocol (RLQP) element whose element ID indicates a Channel Query protocol. Especially, when a STA request a Channel Query with its device identification information and geo-location information as well, this process can be called as a registration process. And, the station may comprise a non-Access Point (AP) station, and the non-AP station may operate as an AP station by receiving the second frame.

The WSM may comprise one or more white space channel units, and each of the white space channel units may comprise a channel number field indicating one of the available channels and a power constraint field indicating a maximum allowable power on each of the indicated channel.

The first frame can further comprise: a length field indicating a length of the information element; a requester station address field indicating a MAC (Medium Access Control) address of the station; and a responder station address filed indicating a MAC address of the RLS or another AP station posting the information element to the RLS.

The second frame can further comprise: a length field indicating a length of the second frame; a requester station address field indicating a MAC (Medium Access Control) address of the station; a responder station address field indicating a MAC address of the RLS or another AP station posting the information element to the RLS; and a WSM field indicating the information on the available channels.

The second frame may comprise an Advertisement Protocol Element whose element ID indicates a specific protocol related to a registered location query protocol (RLQP). The station receiving the second frame may be enabled to operate within the WLAN.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 7 shows the Advertisement Protocol element format, FIG. 8 shows the format of Advertisement Protocol Tuple, FIG. 9 shows a query protocol element format, FIG. 10 shows the format of a query protocol element for DSE enablement, FIG. 14 shows a conceptual diagram for explaining the registration procedure according to one embodiment of the present invention, FIGS. 15 and 16 show exemplary formats of the Registration Request Element and the Registration Response Element defined in the RLQP.

DETAILED DESCRIPTION OF THE INVENTION

Reference will now be made in detail to the embodiments of the present invention, examples of which are illustrated with the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart.

First of all, Wireless Local Area Network (WLAN) system in which embodiments of the present invention can be applied is explained.

Figure 1:
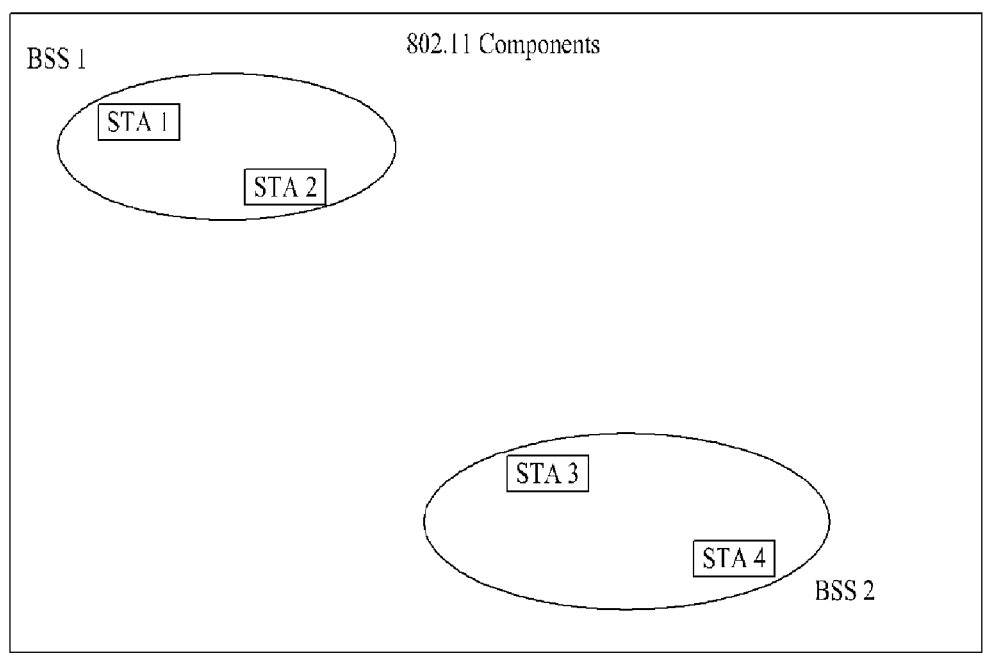
FIG. 1 shows an exemplary architecture of IEEE 802.11 system.

FIG. 1 shows an exemplary architecture of IEEE 802.11 system.

The IEEE 802.11 architecture consists of several components that interact to provide a WLAN that supports STA (station) mobility transparently to upper layers. The basic service set (BSS) is the basic building block of an IEEE 802.11 LAN. FIG. 1 shows two BSSs, each of which has two STAs that are members of the BSS. It is useful to think of the ovals used to depict a BSS as the coverage area within which the member STAs of the BSS may remain in communication. (The concept of area, while not precise, is often good enough.) This area is called the Basic Service Area (BSA). If a STA moves out of its BSA, it can no longer directly communicate with other STAs present in the BSA.

The independent BSS (IBSS) is the most basic type of IEEE 802.11 LAN. A minimum IEEE 802.11 LAN may consist of only two STAs. Since the BSSs shown in FIG. 1 are simple and lack other components (contrast this with FIG. 2), the two can be taken to be representative of two IBSSs. This mode of operation is possible when IEEE 802.11 STAs are able to communicate directly. Because this type of IEEE 802.11 LAN is often formed without pre-planning, for only as long as the LAN is needed, this type of operation is often referred to as an ad hoc network.

A STA's membership in a BSS is dynamic (STAs turn on, turn off, come within range, and go out of range). To become a member of a BSS, a STA joins the BSS using the synchronization procedure. To access all the services of an infrastructure BSS, a STA shall become "associated." These associations are dynamic and involve the use of the distribution system service (DSS).

Figure 2:
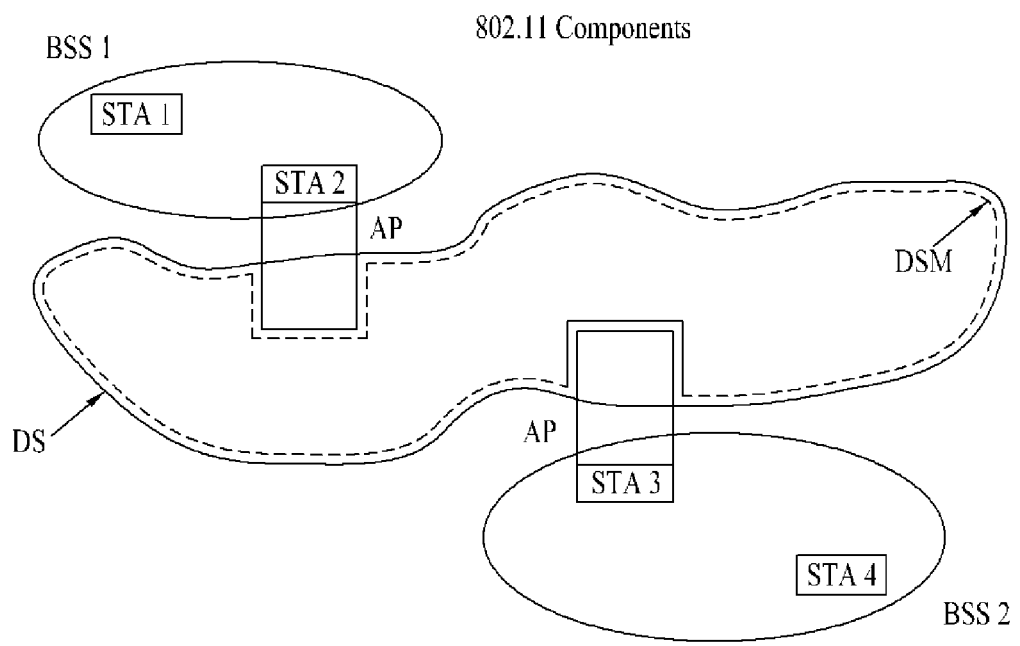
FIG. 2 is another exemplary architecture of IEEE 802.11 system in which the DS, DSM and AP components are added to the IEEE 802.11 architecture picture.

FIG. 2 is another exemplary architecture of IEEE 802.11 system in which the DS, DSM and AP components are added to the IEEE 802.11 architecture picture.

PHY limitations determine the direct station-to-station distance that may be supported. For some networks, this distance is sufficient; for other networks, increased coverage is required. Instead of existing independently, a BSS may also form a component of an extended form of network that is built with multiple BSSs. The architectural component used to interconnect BSSs is the DS (Distribution System).

IEEE Std 802.11 logically separates the WM (wireless Medium) from the distribution system medium (DSM). Each logical medium is used for different purposes, by a different component of the architecture. The IEEE 802.11 definitions neither preclude, nor demand, that the multiple media be either the same or different.

Recognizing that the multiple media are logically different is the key to understanding the flexibility of the architecture. The IEEE 802.11 LAN architecture is specified independently of the physical characteristics of any specific implementation.

The DS enables mobile device support by providing the logical services necessary to handle address to destination mapping and seamless integration of multiple BSSs.

An access point (AP) is any entity that has STA functionality and enables access to the DS, via the WM for associated STAs.

Data move between a BSS and the DS via an AP. Note that all APs are also STAs; thus they are addressable entities. The addresses used by an AP for communication on the WM and on the DSM are not necessarily the same.

Data sent to the AP's STA address by one of the STAs associated with it are always received at the uncontrolled port for processing by the IEEE 802.1X port access entity. In addition, if the controlled port is authorized, these frames conceptually transit the DS.

Hereinafter, Extended Service Set (ESS) for a large coverage network is explained.

Figure 3:
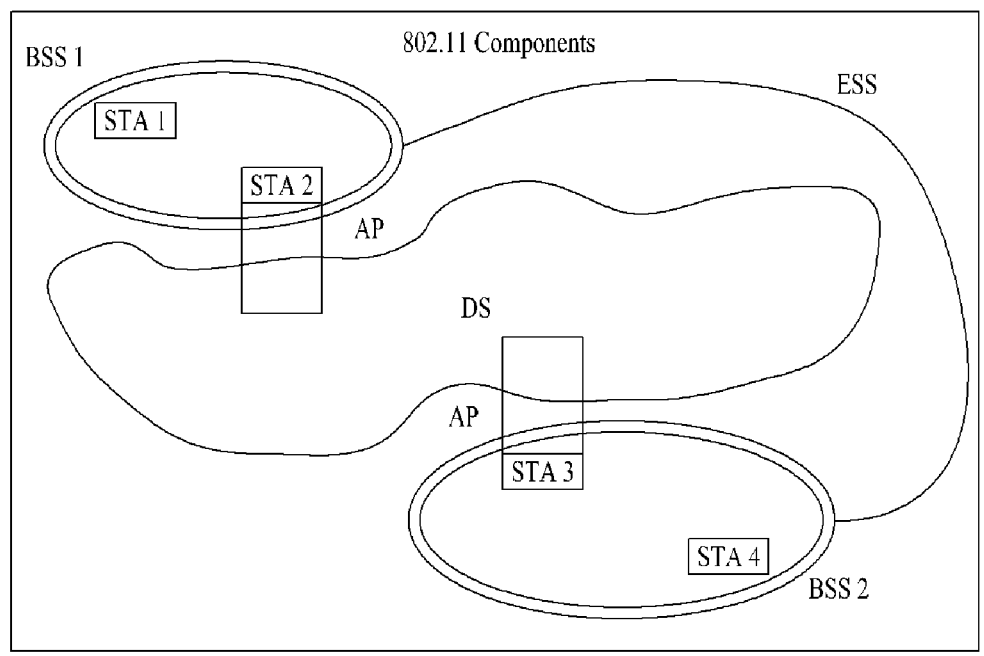
FIG. 3 shows another exemplary architecture of IEEE 802.11 system for explaining the concept of ESS.

FIG. 3 shows another exemplary architecture of IEEE 802.11 system for explaining the concept of ESS.

The DS and BSSs allow IEEE Std 802.11 to create a wireless network of arbitrary size and complexity. IEEE Std 802.11 refers to this type of network as the ESS network. An ESS is the union of the BSSs connected by a DS. The ESS does not include the DS. The key concept is that the ESS network appears the same to an LLC (logical link control) layer as an IBSS network. STAs within an ESS may communicate and mobile STAs may move from one BSS to another (within the same ESS) transparently to LLC.

Nothing is assumed by IEEE Std 802.11 about the relative physical locations of the BSSs in FIG. 3. All of the following are possible:

The BSSs may partially overlap. This is commonly used to arrange contiguous coverage within a physical volume.

The BSSs could be physically disjoint. Logically there is no limit to the distance between BSSs.

The BSSs may be physically collocated. This may be done to provide redundancy.

One (or more) IBSS or ESS networks may be physically present in the same space as one (or more) ESS networks. This may arise for a number of reasons. Some examples are when an ad hoc network is operating in a location that also has an ESS network, when physically overlapping IEEE 802.11 networks have been set up by different organizations, and when two or more different access and security policies are needed in the same location.

Figure 4:
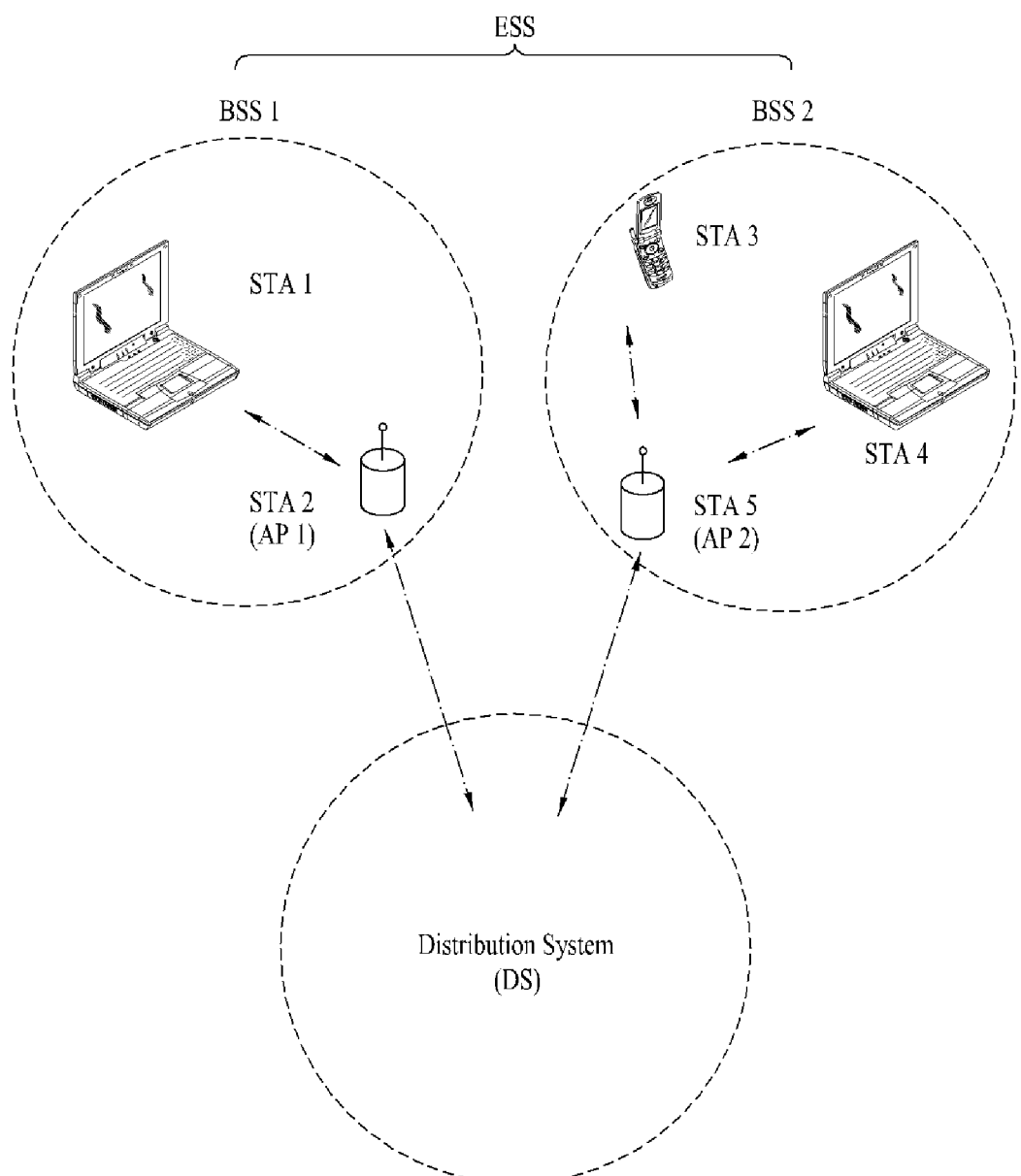
FIG. 4 shows exemplary system architecture for better understanding the WLAN system.

FIG. 4 shows exemplary system architecture for better understanding the WLAN system.

As can be understood, FIG. 4 is an example of infrastructure BSS including DS. And BSS 1 and BSS 2 consist of ESS. In WLAN system, a STA is a device operating according to MAC/PHY regulation of IEEE 802.11, and includes an AP STA and non-AP STA, such a laptop computer, mobile phone, etc. Usually, the device which a user directly handles is non-AP STA. Hereinafter, non-AP STA can be differently called as (terminal), WTRU (Wireless Transmit/Receive Unit), User Equipment (UE), Mobile Station (MS), Mobile Terminal, Mobile Subscriber Unit, etc. AP can corresponds to Base Station (BS), Node-B, BTS (Base Transceiver System), or Femto BS in another field of wireless communication.

Based on this concept, mechanisms for a station to select a channel among available channels within a WS are explained. A station may select a channel to operate within the WS by providing its geographical location with a registered location server (RLS) or a Database when it requests a list of available channel, and by receiving available channel information based on this location information. This kind of procedure can be referred to as a Channel Query process. In some regulatory domains, this Channel Query process can be implemented together with an enabling mechanism. For the convenience of explanation, the enabling mechanism of letting the unlicensed device to operate in WS is explained at first.

In order for the unlicensed device to operate in WS, the unlicensed device should acquire information for available channels not used by incumbent users in WS on which it can operate. The most casual approach for this is defining such that all the unlicensed devices perform sensing whether there is a primary signal of the incumbent user on each of the channels in WS. However, it may cost huge overhead, thus another approach can be a use of a regulatory database, such as TV band database which includes information about which of the channels are available for the WLAN operation at specific geographic location. The present invention prefers to use the latter approach.

Further, if all the unlicensed devices access the regulatory database to acquire information for the available channels, it may be inefficient, and produce large signaling overhead. Thus, the unlicensed devices (STAs) are classified into an enabling STA and a dependent STA. An enabling STA in WS is defined as a STA which determines the available TV channels at its location using its own geographic location identification and accessing TV bands database(s). A dependent STA in WS is defined as a STA receiving available TV channel list from the enabling STA or the dependent AP of that enabling STA that enables its operation. Thus, the enabling STA takes the role to permit the dependent STA to operate within WS within the available channels (the role to enable the dependent STA). This enabling procedure can be called as a dynamic station enablement (DSE) procedure.

Figures 5, 6:
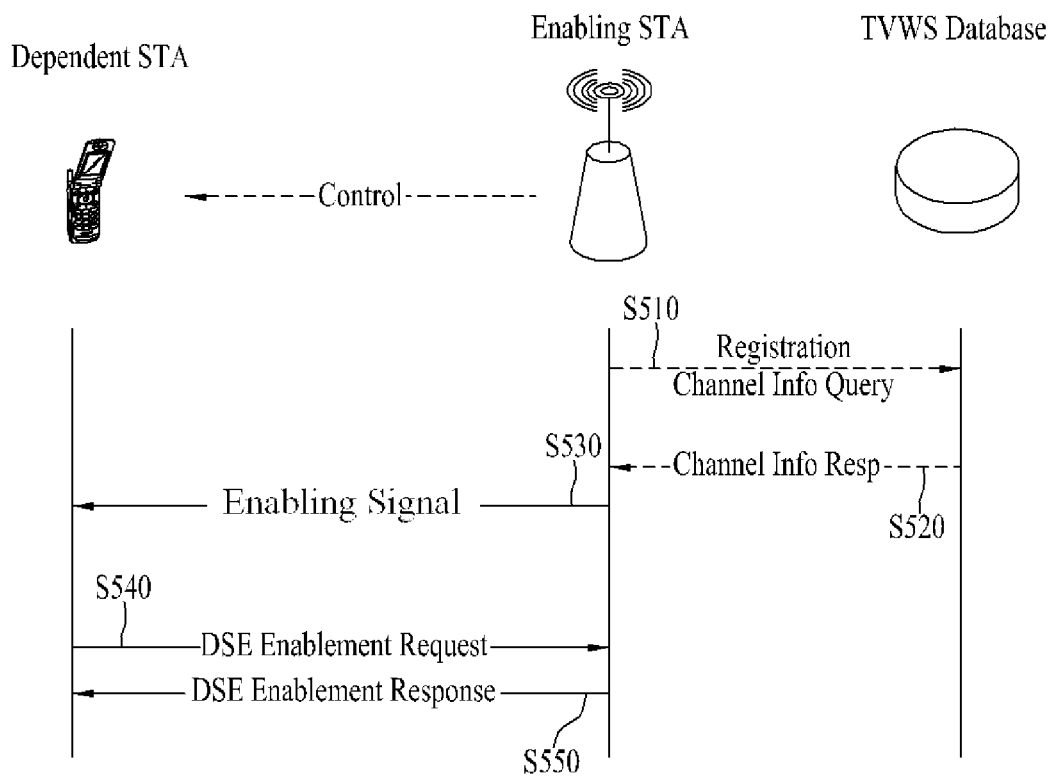
FIG. 5 is a conceptual diagram to explain the enabling mechanism.
FIG. 6 shows an exemplary DSE Enablement Frame format.

FIG. 5 is a conceptual diagram to explain the enabling mechanism.

In FIG. 5, there is a WS database, an enabling STA and a dependent STA. The enabling STA can be either an AP STA or non-AP STA.

According to the embodiment, the enabling STA accesses the WS database for registration and query of channel information (S510). It is more efficient for the enabling STA to acquire available channel list from WS database than sensing each of the channels to determine whether it is available or not. Thus, the enabling STA of FIG. 5 acquires the available channel list from WS database via Channel Info Response (S520).

Then, the enabling AP STA of this example an enabling signal to permit the dependent STA to operate within WS. The enabling signal can be a beacon frame or probe response frame. And, the dependent STA, according to the present embodiment, may exchange DSE related message with the enabling STA. More specifically, the dependent STA may transmit DSE Enablement Request message to the enabling STA for the enablement of the dependent STA (S540). Then, the enabling STA may respond to this request by DSE Enablement Response message (S550).

The dependent STA, receiving and decoding the enabling signal, may transmit Enablement Request Frame to the Enabling STA. Then, the enabling STA transmits Enablement Response Frame to the dependent STA. And if the dependent STA receives it, the DSE procedure is completed.

FIG. 6 shows an exemplary DSE Enablement Frame format.

When DSE Enablement Frame format of FIG. 6 is DSE Enablement frame for DSE Enablement Request, RequesterSTAAddress field indicates MAC address of STA transmitting this DSE Enablement Frame, and ResponderSTAAddress field indicates MAC address of STA receiving this DSE Enablement Frame. Reason Result Code field may indicates whether this DSE Enablement Frame is for DSE Enablement Request, or DSE Enablement Response. Enablement identifier field may indicate enablement ID allocated by the enabling STA to the dependent STA, when DSE Enablement Frame is for DSE Enablement Response.

Thus, RequesterSTAAddress field of the DSE Enablement frame for DSE Enablement request transmitted by dependent STA indicates the MAC address of the dependent STA, and ResponderSTAAddress field indicates the MAC address of the enabling STA, and Reason Result Code field indicates this DSE Enablement Frame is for DSE Enablement Request. And, Enablement identifier field is set to invalid value.

When DSE Enablement Frame format of FIG. 6 is for DSE Enablement Response, the RequesterSTAAddress field of the DSE Enablement frame for DSE Enablement Response indicates the MAC address of the enabling STA, ResponderSTAAddress field indicates the MAC address of the Dependent STA, Reason Result Code field indicates that the DSE Enablement frame is for DSE Enablement Response. And, Enablement identifier field may include Enablement ID allocated to the dependent STA by the enabling STA.

Next, a method of dynamic station enablement procedure according to another example of the present invention is explained. The present example of the present invention proposes a method of performing a DSE enablement procedure using a GAS (generic advertisement service) protocol.

A STA supporting a GAS protocol includes an Interworking element in a Beacon frame and a probe response frame.

ID of an advertisement protocol, supported by a STA, is transmitted through an Advertisement Protocol element. FIG. 7 shows the Advertisement Protocol element format. The Advertisement Protocol element is transmitted through a Beacon frame or a Probe Response frame.

As shown in FIG. 7, the Advertisement Protocol element includes a plurality of Advertisement Protocol Tuple fields. The format of Advertisement Protocol Tuple is shown in FIG. 8.

As shown in FIG. 8, the Advertisement Protocol Tuple field includes The Query Response Length Limit field, the Pre-Association Message Exchange BSSID Independent (PAME-BI) field and Advertisement Protocol ID field.

The Query Response Length Limit field indicates the maximum number of octets transmitted by a STA in the Query Response field contained within one or more GAS Comeback Response frames.

The PAME-BI field is used by an AP to indicate whether the Advertisement Server, which is the non-AP STA's peer for this Advertisement Protocol, will return a Query Response which is independent of the BSSID used for the GAS frame exchange.

The Advertisement Protocol ID field indicates an advertisement protocol supported by a STA.

Exemplary values of Advertisement Protocol IDs are defined in table 1.

TABLE 1

| Name | Value |
| --- | --- |
| Access Network Query Protocol | 0 |
| MIH Information Service | 1 |
| MIH Command and Event Service Capability Discovery | 2 |
| Emergency Alert System (EAS) | 3 |
| Location-to-Service Translation Protocol | 4 |
| Registered Location Query Protocol | 5 |
| Reserved | 6-220 |
| Vendor Specific | 221 |
| Reserved | 222-255 |

The Advertisement Protocol ID field is set to 0 to indicate the STA supports Access Network Query Protocol (ANQP), and the Advertisement Protocol ID field is set to 5 to indicate the STA supports Registered Location Query Protocol (RLQP). RLQP is a query protocol for registered location information retrieval from registered location server (RLS) by GAS Public Action frames.

In the present example of the present invention, DSE procedure is performed through ANQP or RLQP.

According to the embodiment of the present invention, an enabling signal is Beacon frame, a Probe response frame or a GAS initial response frame containing an Advertisement Protocol element with an Advertisement Protocol tuple whose Advertisement Protocol ID value is set to the value of the ANQP or the RLQP specified in Table 1, indicating that enablement is possible.

A case that an enabling signal is a GAS initial response frame will be explained referring to FIG. 9.

According to the present example of the present invention, a dependent STA can acquire an enabling signal from an enabling STA or an AP through ANQP or RLQP.

First STA which received an ANQP (or RLQP) request from second STA can respond to a query with and without proxying the query to a server in an external network. For example, if the first STA receive an ANQP (or RLQP) request for enabling signal from second STA, the first STA can transmit ANQP (or RLQP) response including enabling information to the dependent STA through proxying the query to a server in an external network or using local information of the enabling STA or the AP.

A dependent STA transmits a GAS Initial Request frame to request DSE Registered Location information to an enabling STA or an AP.

Table 2 shows a GAS Initial Request frame format.

TABLE 2

| Order | Information |
|---|---|
| 1 | Category |
| 2 | Action |
| 3 | Dialog Token |
| 4 | Advertisement Protocol element |
| 5 | Query Request Length |
| 6 | Query Request |

As shown in table 2, the GAS Initial Request frame includes an Advertisement Protocol element and a Query Request field.

The Advertisement Protocol element of the GAS Initial Request frame includes Advertisement Protocol tuple whose Advertisement Protocol ID value is set to the value of the ANQP or the RLQP specified in Table 1.

The Query Request field includes information (Info) ID allocated for DSE Registered Location information. Info ID indicates information related with the query. For example, if a dependent STA transmits the GAS Initial Request frame through ANQP, the Advertisement Protocol element of the GAS Initial Request frame includes Advertisement Protocol tuple whose Advertisement Protocol ID value is set to the value of the ANQP, and the Query Request field includes ANQP Info ID allocated for DSE Registered Location information.

The enabling STA or the AP which received a GAS Initial Request frame transmits a GAS Initial Response frame to the dependent STA.

Table 3 shows a GAS Initial Response frame format.

TABLE 3

| Order | Information |
|---|---|
| 1 | Category |
| 2 | Action |
| 3 | Dialog Token |
| 4 | Status Code |
| 5 | GAS Comeback Delay |
| 6 | Advertisement Protocol element |
| 7 | Query Response Length |
| 8 | Query Response (optional) |

As shown in table 3, the GAS Initial Response frame includes an Advertisement Protocol element and a Query Response field. The Query Response field of the GAS Initial Response frame includes a query protocol element.

FIG. 9 shows a query protocol element format. That is, ANQP element format and RLQP element format are as FIG. 9. As show in FIG. 9, a query protocol element includes an Info ID field, a length field, and an information field.

Each query protocol element is assigned a unique Info ID pre-defined. Info ID indicates information related with the query. That is, Info ID indicates what the query protocol element is related with.

After the dependent STA received the enabling signal, it exchanging DSE related messages with the enabling station using a GAS protocol. That is, the dependent STA transmits first query protocol element for DSE enablement request to the enabling station, the first query protocol element including first Info ID set to a value for DSE enablement, and receives second query protocol element for DSE enablement response from the enabling station, the second query protocol element including second Info ID set to a value for DSE enablement.

FIG. 10 shows the format of a query protocol element for DSE enablement.

As shown in FIG. 10, the query protocol element for DSE enablement includes an Info ID field, Length field, RequesterSTAAddress field, ResponderSTAAddress field, Reason Result Code field, an Enablement identifier field and White Space Map (WSM) element body.

The Info ID field shall be set to the value for DSE Enablement pre-defined.

The Length is a field that indicates the length of the remaining element fields in octets, and the value is variable.

The RequesterSTAAddress field, the ResponderSTAAddress field, the Reason Result Code field, the Enablement identifier field are same as those of the DSE Enablement frame illustrated in FIG. 6.

Figure 11:
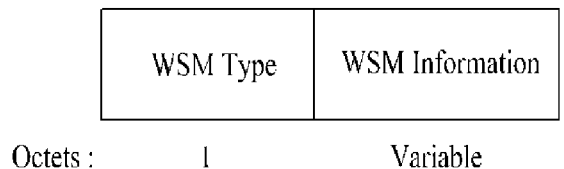
FIG. 11 shows a WSM element body.

FIG. 11 shows a WSM element body.

Preferably, WSM element body comprises available channel and frequency information from the regulatory database. Further, as stated above, when the unlicensed device operates on a specific channel which is available in WS and the neighboring channel next to the specific channel is used by an incumbent user, the unlicensed device should lower its transmission power to protect the incumbent user. Therefore, WSM element comprises available channel list and maximum allowed transmission power of the available channels from the regulatory database. Actual maximum of transmission power level may be decided depending on the channel bandwidth and the maximum allowed transmission powers per available channel. When the operational channel bandwidth (WLAN channel) spans multiple channels indicated in the WSM, whose maximum power levels are different, the operational transmission power level shall be constrained by the minimum transmission power level of those multiple channels, which are indicated in the WSM. In a TV White Space (TVWS), the available channel list may comprise TV channel numbers. However, in some other examples, the available channel list may comprise frequency information where the available channels are located.

As shown in FIG. 11, WSM element bode may comprise WSM Type field and WSM Information field.

WSM type field may indicate the type of WSM information. Specifically, WSM type may indicate whether WSM information is TV Band WSM, or other type of WSM. If WSM type indicates that the present WSM element is TV Band WSM element, this WSM element is a WSM element including the available channel list and the maximum transmission powers allowed for each of the available channels, which was acquired from TV band database by the enabling STA.

Figure 12:
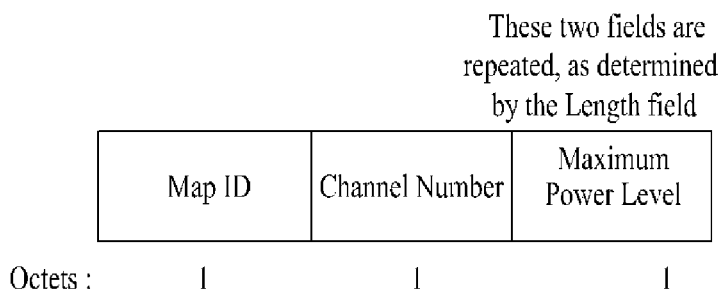
FIG. 12 shows one exemplary structure of TV Band WSM.

FIG. 12 shows one exemplary structure of TV Band WSM. As shown in FIG. 12, TV Band WSM may comprise MAP ID field, Channel Number field, Maximum Power Level field.

Figure 13:
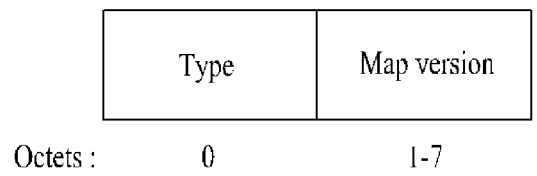
FIG. 13 illustrates the format of the Map ID bits.

Map ID field is an identifier of the TV band WSM information field format for a TV band WSM and the format of the Map ID bits is illustrated in FIG. 13.

Referring to FIG. 13, type bit is one bit in length and indicates whether the following channel list is a full channel list or a partial channel list. If the Type bit is set to 1, the following channel list is a full channel list and if the Type bit is set to 0, the following channel list is a partial channel list.

Map version of FIG. 13 may be 6 bits in length and identifies the version of WSM. When the available channel information from the TV band database is updated and the corresponding WSM is updated, then the Map version is circularly incremented by 1 and the default bit value of the Map version is 0000000. If a STA receives several WSMs with the same Map version and the Type bit is set to 0 (partial WSM), the STA shall construct the whole channel list using the multiple WSMs having the same Map version.

Now, referring back to FIG. 12, the Channel Number field may be a positive integer value that indicates where the TV channel is available for WLAN operation. The length of the Channel Number field may be set as 1 octet. When the Channel Number and Maximum Power Level pairs are repeated (as indicated in FIG. 20), they shall be listed in increasing TV channel numbers.

To operate in WS, a station should select a channel to begin its transmission among available channels. For this end, a station shall perform a Channel Query process (registration procedure) before it can select the channel.

Figures 14, 15:
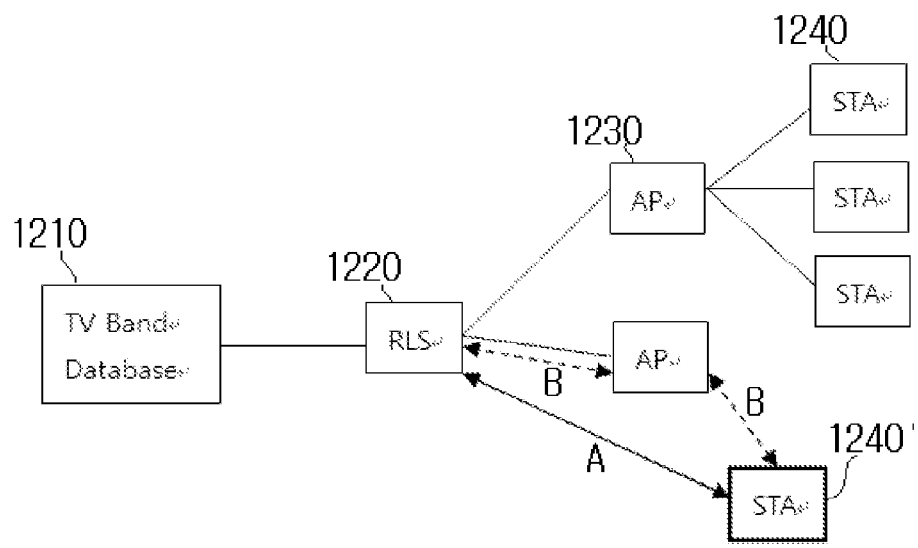

FIG. 14 shows a conceptual diagram for explaining the Channel Query procedure according to one embodiment of the present invention.

Figure 17:
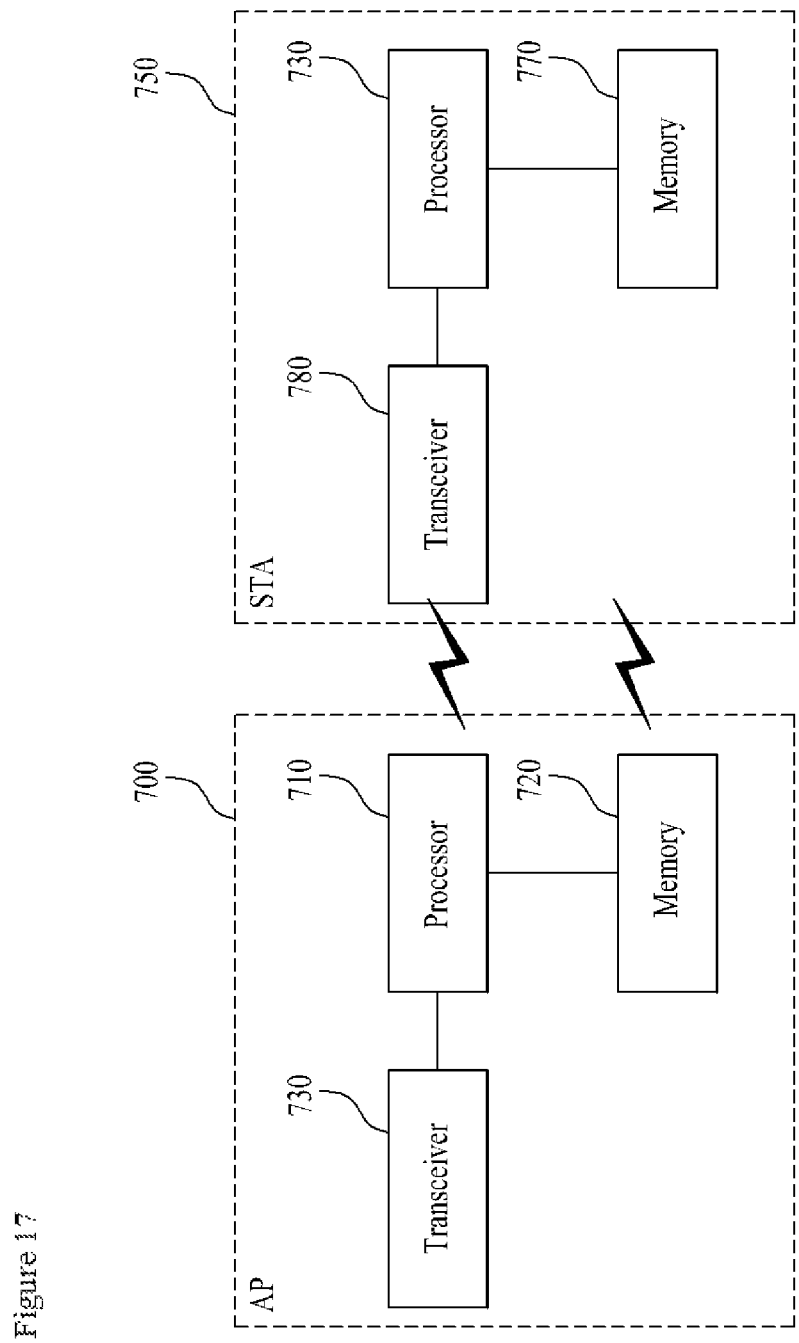
FIG. 17 is a schematic block diagram of wireless apparatuses implementing exemplary embodiments of the present invention.

A TV band database (1210) can comprise available channel information in TV band. RLS (1220) may be a server comprising registered geographic location information for all the APs (1230) operating in WS. Although FIG. 17 shows RLS (1220) as a separate apparatus from the TV Band Database (1210), the RLS (1220) can be incorporated into a part of the TV Band Database or an AP (1230).

If an unlicensed device wants to operate as AP STA (1230), it should provide its geographical location with RLS (1220) or TV Band Database when it query available channel list. On the other hand, according to one embodiment of the present invention, if a STA (1240') wants to operate as AP STA transmitting beacon signal and forming a network, STA (1240') should have an available channel list at its location by providing its geo-location when it transmits Channel Query request to RLS(1220) or TV Band Database(1210). In this embodiment, STA (1240') can transmit a Channel Query request using RLQP (or ANQP). Further, as shown in FIG. 17, the STA (1240') may transmit the Channel Query request defined within RLQP (or ANQP) directly to RLS (1220) (path 'A') or through an AP STA (1230) associated with the STA (1240').

Hereinafter, the Channel Query request/response mechanism with RLQP, and appropriate formats are explained according to one embodiment of the present invention.

A STA, who wants to operate as an AP STA, should provide device identification information and geographical location information preferably with +/−50 m resolution when it transmit channel query request. This device identification information may comprise a FCC identifier and a serial number allocated by the manufacture. Further, the STA has to receive information on available channels at its location in a Channel Query response.

Therefore, one embodiment of the present invention proposes a Channel Query Request format providing a STA's location information, and a Channel Query Response format in response to the Channel Query Request within RLQP. Table 4 shows information IDS for this embodiment.

TABLE 4

| Info Name | Info ID |
| --- | --- |
| Reserved | 0 |
| DSE Enablement | 1 |
| Channel Query Request | 2 |
| Channel Query Response | 3 |
| Reserved | 4-220 |
| Vendor Specific | 221 |
| Reserved | 222-255 |

As shown in the example of Table 4, information IDs 2 and 3 indicate the Channel Query Request and the Channel Query Response, respectively.

FIGS. 15 and 16 show exemplary formats of the Channel Query Request Element and the Channel Query Response Element defined in the RLQP.

First, Information ID field of the Channel Query Request Element (FIG. 15) indicates that the present element is the Channel Query Request Element (e.g. value 2 of Table 4). Length field indicates the length of the present element.

Requester STA Address field and Responder STA address field indicate MAC addresses of the STA requesting this registration and the STA to which this element is directed. As stated above, Responder STA address field may indicates the MAC address of RLS or the AP STA associated with the STA.

Enablement Identifier field indicates an ID allocated to the STA by the enabler/enabling STA.

Following FCC identifier field, Serial number field, and LCI (Location Configuration Information) field are for the information to be provided with RLS or Database. FCC identifier field indicates an FCC identifier allocated by FCC. The serial number field indicates a serial number allocated by the manufacture. And, LCI field indicates geographical location of the STA, with altitude, height, and optional azimuth (or the equivalents). This geographical location information can be represented with 123 bit within B0~B122 of LCI field of DSE Registered location element body field shown FIG. 6.

When RLS or an AP STA receives the Channel Query request from a STA, the RLS or the AP STA transmits the Channel Query response as shown in FIG. 16. Information ID field indicates the present element is Channel Query response element (e.g. value 3 of Table 4). A length field, a requester STA address field, responder STA address field and an Enablement identifier field of the registration response element are the same as the registration request element. As shown in FIG. 16, the present embodiment proposes to include the WSM into the Channel Query response element such that the STA receiving this can operate itself or managing other STAs to operate within the available channels.

It should be noted that mobile APs, which does not have wired connection with enabler/RLS, are the ones who performs the above explained Channel Query procedure. Therefore, one embodiment of the present invention proposes that if the location of the STA changed, the STA updates its location information within the RLS, and acquire information on the available channel at the changed location. In this update procedure, the FCC ID field and the serial number field of the Channel Query Request/Response element can be omitted.

The above explained embodiments are based on the assumption that the Channel Query procedure is performed after the DSE procedure. However, another embodiment of the present invention proposes to perform the Channel Query procedure before the DSE procedure.

Using the above explained RLQP (or ANQP), non-AP STA can operate as an AP STA after getting available channel list at its location by transmitting its identification information and geo-location information in Channel Query request. The Channel Query procedure can be performed before/after the DSE procedure.

Hereinafter, apparatuses for these non-AP STA and AP STA are briefly explained.

FIG. 17 is a schematic block diagram of wireless apparatuses implementing exemplary embodiments of the present invention.

An AP 700 can include a processor 710, a memory 720, a transceiver 730, and a STA 750 may include a processor 760, a memory 770, and a transceiver 780. The transceivers 730 and 780 transmit/receive a radio signal and implement an IEEE 802 physical layer, and can be separated as transmitters and receivers. The processors 710 and 760 are connected with the transceivers 730 and 760 to implement an IEEE 802 physical layer and/or MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When exemplary embodiments are implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

Among these elements of apparatuses for AP/STA, the structure of processor 710 or 760 will be more specifically explained.

Figure 18:
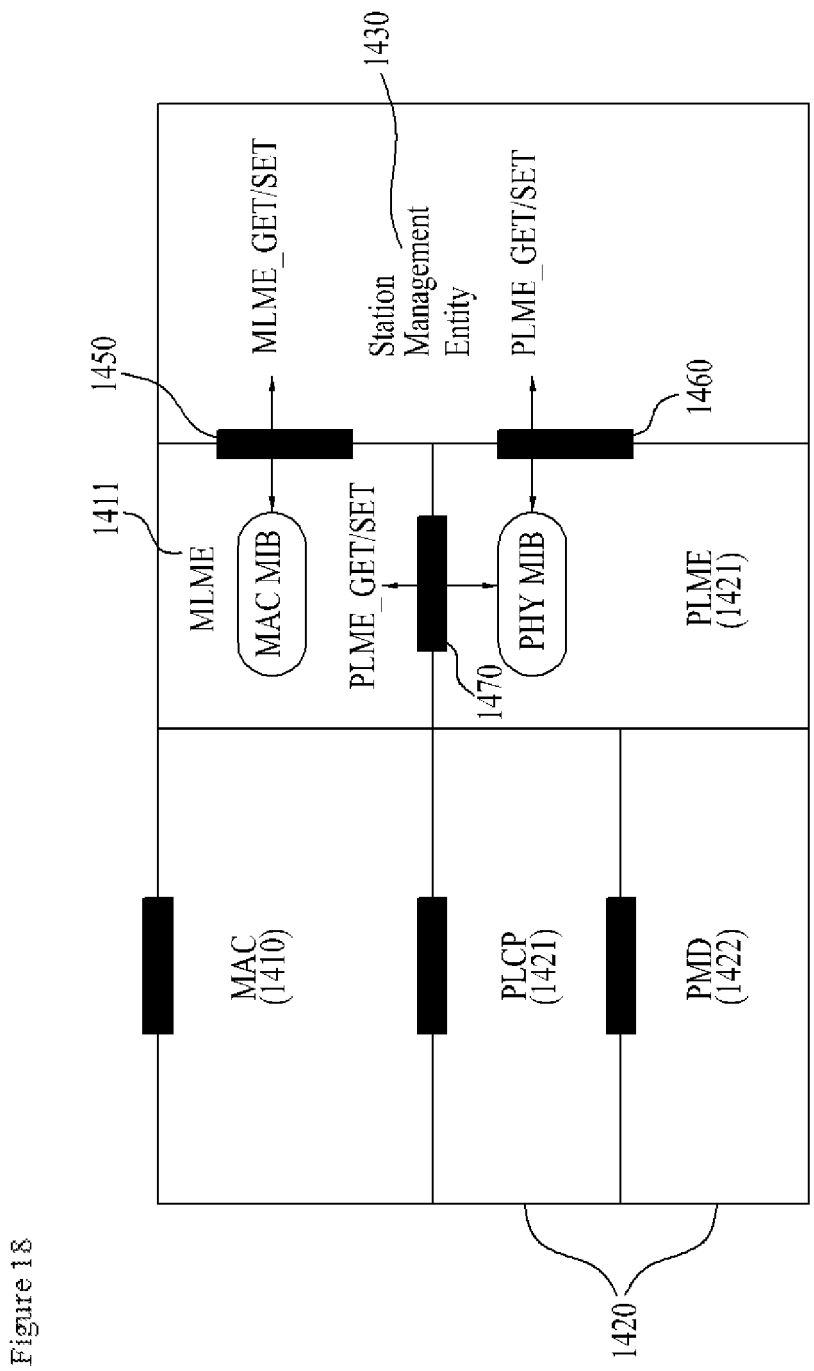
FIG. 18 shows an exemplary structure of processor of STA apparatus according to one embodiment of the present invention.

FIG. 18 shows an exemplary structure of processor of STA apparatus according to one embodiment of the present invention.

Processor 710 or 760 of STA may have multiple layer structures, and FIG. 18 especially focuses on MAC sublayer (1410) on data link layer (DLL) and Physical layer (1420) among these layers. As shown in FIG. 18, PHY (1420) may include PLCP entity (physical layer convergence procedure entity; 1421) and PMD entity (physical medium dependent entity; 1422). Both the MAC sublayer (1410) and PHY (1420) conceptually include management entities, called MLME (MAC sublayer Management Entity; 1411) and PLME (physical layer management entity; 1421), respectively. These entities (1411, 1421) provide the layer management service interfaces through which layer management functions can be invoked.

In order to provide correct MAC operation, an SME (Station Management Entity; 1430) is present within each STA. The SME (1430) is a layer independent entity that can be viewed as residing in a separate management plane or as residing "off to the side." The exact functions of the SME (1430) are not specified in this document, but in general this entity (1430) can be viewed as being responsible for such functions as the gathering of layer-dependent status from the various layer management entities (LMEs), and similarly setting the value of layer-specific parameters. SME (1430) would typically perform such functions on behalf of general system management entities and would implement standard management protocols.

The various entities within FIG. 18 interact in various ways. FIG. 18 shows some examples of exchanging GET/SET primitives. XX-GET.request primitive is used for requesting the value of the given MIB attribute (management information base attribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

As shown in FIG. 18, MLME (1411) and SME (1430) may exchange various MLME_GET/SET primitives via MLME_SAP (1450). According to one example of the present invention, upon receipt of a GAS Initial Request frame, an MLME-GAS.indication primitive shall be issued to the STA's SME (1430). Upon receipt of an MLME-GAS.response primitive, the STA shall transmit a GAS Initial Response frame to the requesting STA.

Also, as shown in FIG. 18, various PLCM_GET/SET primitives may be exchanged between PLME (1421) and SME (1430) via PLME_SAP (1460), and between MLME (1411) and PLME (1470) via MLME-PLME_SAP (1470).

WSM element of one example of the present invention can be transmitted by the sequential procedures of MAC (1410) and PHY (1420). Also, WSM element of one example of the present invention can be received by the sequential procedures of PHY (1420) and MAC (1410).

Although the examples and embodiments of the present invention have been disclosed in view of each aspect of the invention, those skilled in the art will appreciate that examples and embodiments of each aspect of the invention can be incorporated. And, there can be advantages not explicitly discussed, since they are obvious from the description for those skilled in the art.

What is claimed is:

1. A method for a station to operate within available channels in a Wireless Local Area Network (WLAN), the method comprising:
    transmitting a request including an information element including element ID indicating a registered location query protocol, and location information of the station;
    receiving a response including a result of the query, and White Space Map (WSM) information including the available channels for the location information; and
    beginning a transmission of signals in the WLAN after obtaining the WSM information.

2. The method of claim 1, wherein the information element further comprises device identification information of the station.

3. The method of claim 2, wherein the device identification information comprises a FCC (Federal Communications Commission) identifier of the station, and a serial number of the station.

4. The method of claim 1, wherein the information element is a registered location query protocol (RLQP) element whose element ID indicates a Channel Query protocol.

5. The method of claim 1, wherein the WSM comprises one or more white space channel units, and each of the white space channel units comprises a channel number field indicating one of the available channels and a power constraint field indicating a maximum allowable power on each of the indicated channel.

6. The method of claim 1, wherein the result of the query is acquired from a registered location server (RLS).

7. The method of claim 6, wherein the request further comprises:
- a length field indicating a length of the information element;
- a requester station address field indicating a MAC (Medium Access Control) address of the station; and
- a responder station address filed indicating a MAC address of the RLS or another AP station posting the information element to the RLS.

8. The method of claim 6, wherein the response further comprises:
- a length field indicating a length of the second frame;
- a requester station address field indicating a MAC (Medium Access Control) address of the station;
- a responder station address field indicating a MAC address of the RLS or another AP station posting the information element to the RLS; and
- a WSM field indicating the information on the available channels.

9. The method of claim 1, wherein the response comprises an Advertisement Protocol Element whose element ID indicates a specific protocol related to a registered location query protocol (RLQP).

10. A station device for operating within available channels in a Wireless Local Area Network (WLAN), the station device comprising:
- a transmitter configured for transmitting a request including an information element including element ID indicating a registered location query protocol, and location information of the station device;
- a receiver configured for receiving a response including a result of the query, and White Space Map (WSM) information including the available channels for the location information of the station device; and
- a processor operably connected to the transmitter and the receiver and configured for beginning a transmission of signals in the WLAN after obtaining the WSM information.

* * * * *